United States Patent [19]
Tweed

[11] 4,312,121
[45] Jan. 26, 1982

[54] CONNECTION SYSTEM FOR HEATER STRIPS

[75] Inventor: Donald G. Tweed, Mountain View, Calif.

[73] Assignee: Raychem Corporation, Menlo Park, Calif.

[21] Appl. No.: 6,772

[22] Filed: Jan. 26, 1979

[51] Int. Cl.³ .................. H01C 1/022; H02G 3/18
[52] U.S. Cl. ..................................... 29/611; 29/613; 174/65 SS; 219/301
[58] Field of Search .................. 29/611, 612, 613; 219/301, 535, 536; 174/65 SS; 138/33

[56] References Cited

U.S. PATENT DOCUMENTS

| | | | |
|---|---|---|---|
| 2,062,400 | 12/1936 | Dann | 174/65 SS |
| 2,941,025 | 6/1960 | Wayman | 174/65 SS |
| 2,972,002 | 2/1961 | Wayman | 174/65 SS |
| 3,055,972 | 9/1962 | Peterson | 174/65 SS |
| 3,153,695 | 10/1964 | Hill | 174/65 SS |
| 3,697,089 | 10/1972 | Jacisin | 174/65 SS |
| 3,793,716 | 2/1974 | Smith | 219/504 |
| 4,152,577 | 5/1979 | Leavines | 219/301 |

FOREIGN PATENT DOCUMENTS

| | | | |
|---|---|---|---|
| 894411 | 10/1953 | Fed. Rep. of Germany | 174/65 SS |
| 1255173 | 11/1967 | Fed. Rep. of Germany | 174/65.1 |
| 131239 | 4/1951 | Sweden | 174/65 SS |

Primary Examiner—Gene P. Crosby
Attorney, Agent, or Firm—Lyon & Lyon

[57] ABSTRACT

An apparatus and method for electrically connecting a heater strip is described. The apparatus is characterized in that a deformable grommet assembly is placed around the heater strip, so that the grommet assembly can be deformed by a pressure plate so that it fits tightly against the heater strip. The grommet assembly can hold the heater strip away from a support surface of the pipe on which the heater strip is mounted and can hold the heater strip oriented perpendicularly relative to the support surface. A grounding plate can be provided for pressing a grounding element of the heater strip against the pressure plate.

An apparatus based on the same grommet assembly for electrically terminating a heater strip is also described.

24 Claims, 6 Drawing Figures

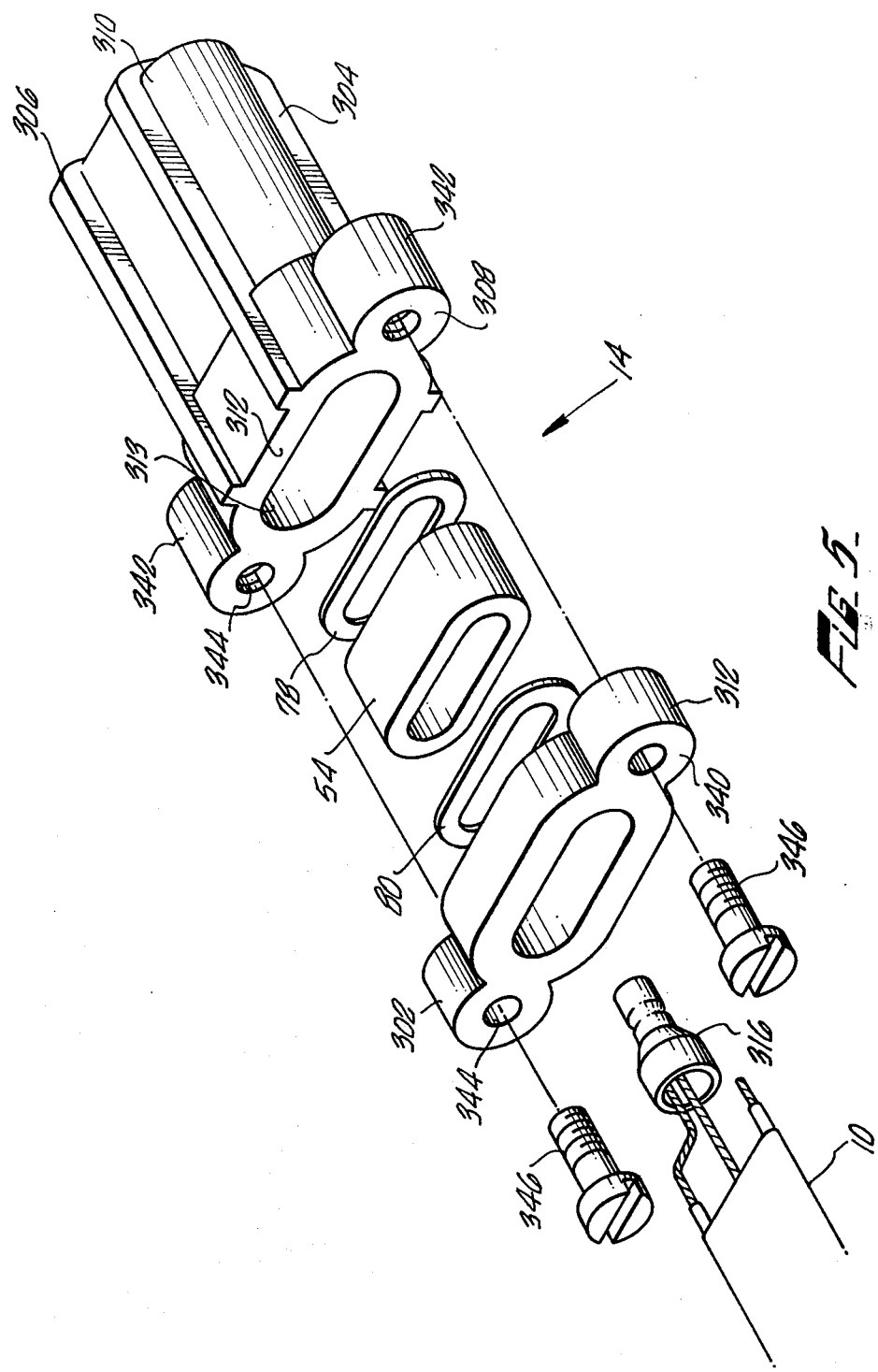

CONNECTION SYSTEM FOR HEATER STRIPS

BACKGROUND

Heater strips for heat tracing pipe, tanks, and other objects are well-known. For example, U.S. Pat. No. 3,793,716 describes a heater strip comprising two conductive wires embedded in a positive temperature coefficient polymeric material. The heater strip can also include a grounding element. In use, these heater strips are mounted on a support surface such as the exterior of pipe, covered with insulation, connected to a power source, and used to protect the contents of the pipe from freezing or to maintain the contents of the pipe at a desired temperature.

Three types of electrical connections are used with heater strips: the heater strips are connected to a power source, they are terminated at one end away from the power source, and two or more strips are spliced together.

A variety of connecting devices have been developed for effecting these types of connections. A whole host of products has made its way to the market, the products being different for the different types of heater strips available and the different sizes of heater strips available.

This lack of standardization of connection devices has caused great difficulty in the installation of heater strips. This is because many of the devices used are cumbersome and large because it is desirable that the electrical connections be both water-proof and resistant to attack by the chemicals and solvents carried in the pipes being heated. With many available devices, it is difficult to make the connection because it is necessary that the wires be buried deep in the device. Furthermore, due to the lack of standardization of connecting devices, the devices tend to be expensive and require a relatively high degree of skill in assembly and attachment.

Commercially available housings are generally inadequately secured to the pipe. Thus, when the housing is accidentally tripped over or otherwise struck, it shifts position on the pipe which can result in a broken connection.

Therefore, there is a need for an apparatus and method for electrically connecting heater strips which are applicable for a large variety of types and sizes of heater strips, which are easy to use, which provide a secure, and water-proof connection, and which protect the connected heater strip against solvents and other chemicals carried in the pipe in case of rupture or spill.

SUMMARY

The present invention is directed to an apparatus and method with the above features. The apparatus includes a sealing assembly comprising deformable, electrically-nonconductive sealing means such as an oval-shaped grommet assembly adapted to fit circumferentially around a heater strip and adapted to maintain an end of the heater strip away from the support surface on which the heater strip is mounted. The sealing means also maintains the heater strip oriented perpendicular to the support, i.e. when the support surface is pipe, oriented radially relative to the longitudinal axis of the pipe. The sealing assembly includes a chamber which contains the grommet assembly, the walls of the chamber substantially completely enclosing the grommet assembly. There is also provided means for deforming the grommet assembly so that it substantially completely fills the chamber and presses tightly against the heater strip.

For terminating a single heater strip only one grommet assembly is used. For splicing two heater strips together or for connecting two heater strips to a power source, two grommet assemblies in side-by-side relationship are used. Preferably the chamber is sufficiently large that a grommet assembly of standard dimensions can be placed in the chamber, where the grommet assembly is sufficiently large that it can be used for many different sizes and shapes of heater strips. The only change necessary to adapt the sealing assembly for different sized heater strips is to use a grommet having a different sized hole therethrough so that the grommet can fit circumferentially around the heater strip.

The grommet assembly can be a single grommet or more than one grommet stacked on top of each other. When more than one grommet is used, it can be advantageous that at least one grommet be formed from a material different from the material from which another grommet is formed. For example, one grommet can be formed from a material selected for chemical resistance, and another grommet can be formed from a material selected for its easy deformability.

When using this sealing assembly for connecting a heater strip to a power source or for splicing two heater strips together, preferably the sealing assembly is mounted in a housing comprising a mounting bracket adapted to sit on the exterior of the support surface such as pipe. The mounting bracket has at least two flanges extending along the exterior surface of the pipe for placement of a pipe clamp on each flange and around the pipe for maintaining the housing in a selected position on the pipe. The housing can include an electrically conductive grounding plate for pressing a grounding element of a heater strip against the deforming means.

This housing and sealing assembly allow safe and secure connection of a heater strip. Because of the sealing assembly, the heater strip is protected against the environment, including moisture and the contents of the substrate for which the heater strip is used. The ends of the conductors of the heater strip are held up and away from the support surface, thereby providing easy access, even after installation of insulaton on the pipe. In addition, standardization of parts is possible because by changing only the grommet assemblies, the housing and sealing assembly can be used for different types of heater strips of different sizes.

DRAWINGS

These and other features, aspects and advantages of the present invention will become better understood with reference to the following description, appended claims, and accompanying drawings where:

FIG. 5 is an exploded perspective view of the end seal assembly of FIG. 1; and

DESCRIPTION

Figure 1:
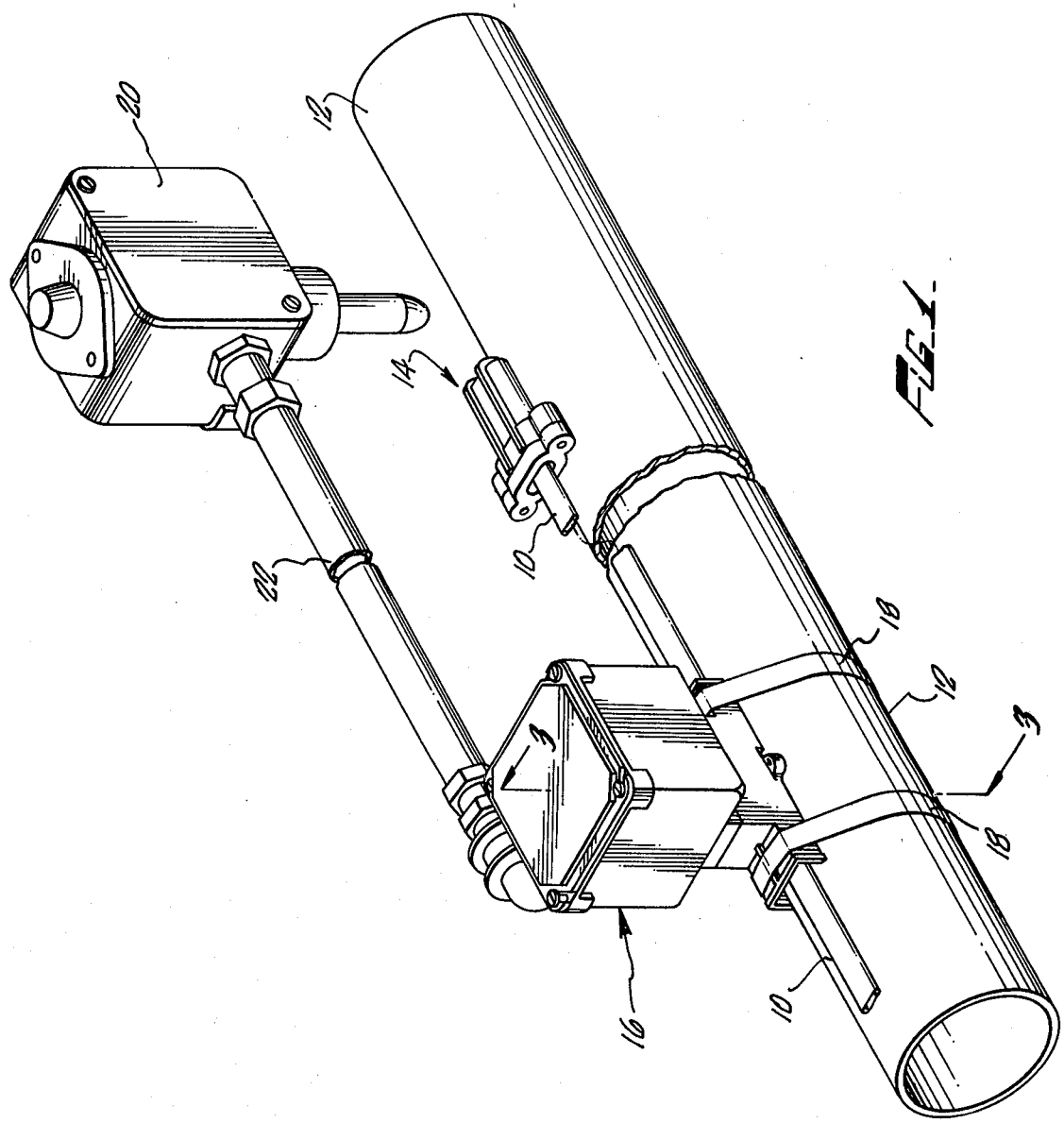
FIG. 1 is a perspective view of an end seal assembly for a heater strip and a power connection assembly for connecting two heater strips to a single power source in accordance with the present invention.

In FIG. 1 there are shown a section of two heater strips 10 mounted on a horizontally oriented pipe 12, one of the heater strips being electrically terminated in an end seal assembly 14 according to the present invention. Both heater strips are connected to a power cable in a power connection assembly 16 which is secured to the pipe by two hose clamps 18. A power source 20 is connected to the power connection assembly 16 by means of electrical conduit 22 in which the power cable is provided. The heater strips 10, the end seal assembly 14, and the power connection assembly 16 can be used with support surfaces other than horizontally oriented pipe. For example, they can be used with tanks, flat surfaces, and vertically oriented pipe. Adapter plates can be used so these assemblies can be mounted on pipes of varying diameter.

As used herein, the term "parallel to a support surface" means, for example, with reference to a cylindrical substrate such as pipe, parallel to the longitudinal axis of the pipe.

As used herein, the term "perpendicular to a support surface" means, for example, with reference to a cylindrical substrate such as pipe, oriented radially relative to the longitudinal axis of the pipe.

There will now be discussed the details of the power connection assembly (FIGS. 2 and 3), a splice connection assembly (FIG. 4) and the end seal assembly 14 (FIG. 5).

THE POWER CONNECTION ASSEMBLY

Figure 2:
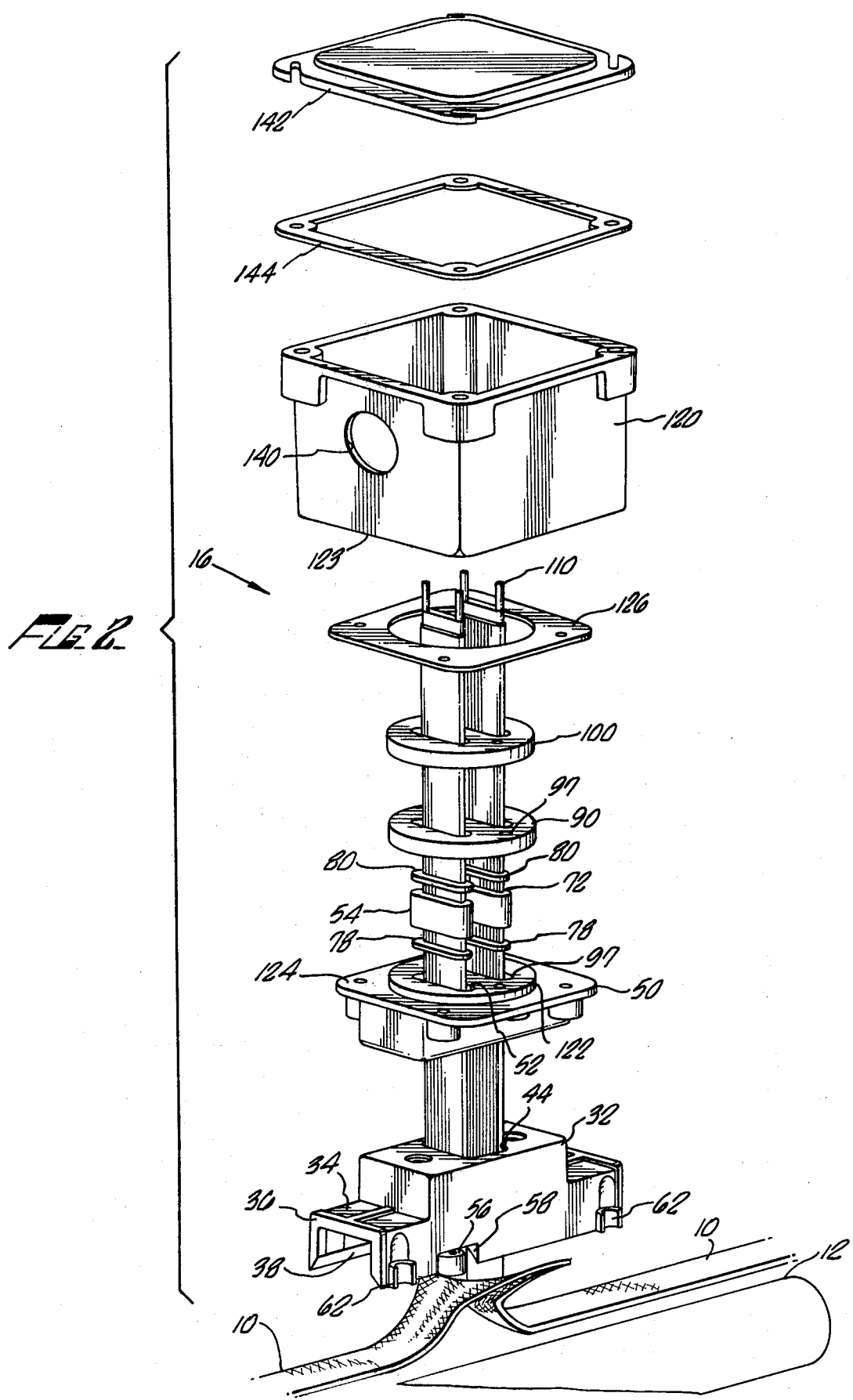
FIG. 2 is an exploded elevation view of the power connection of FIG. 1.
Figure 3:
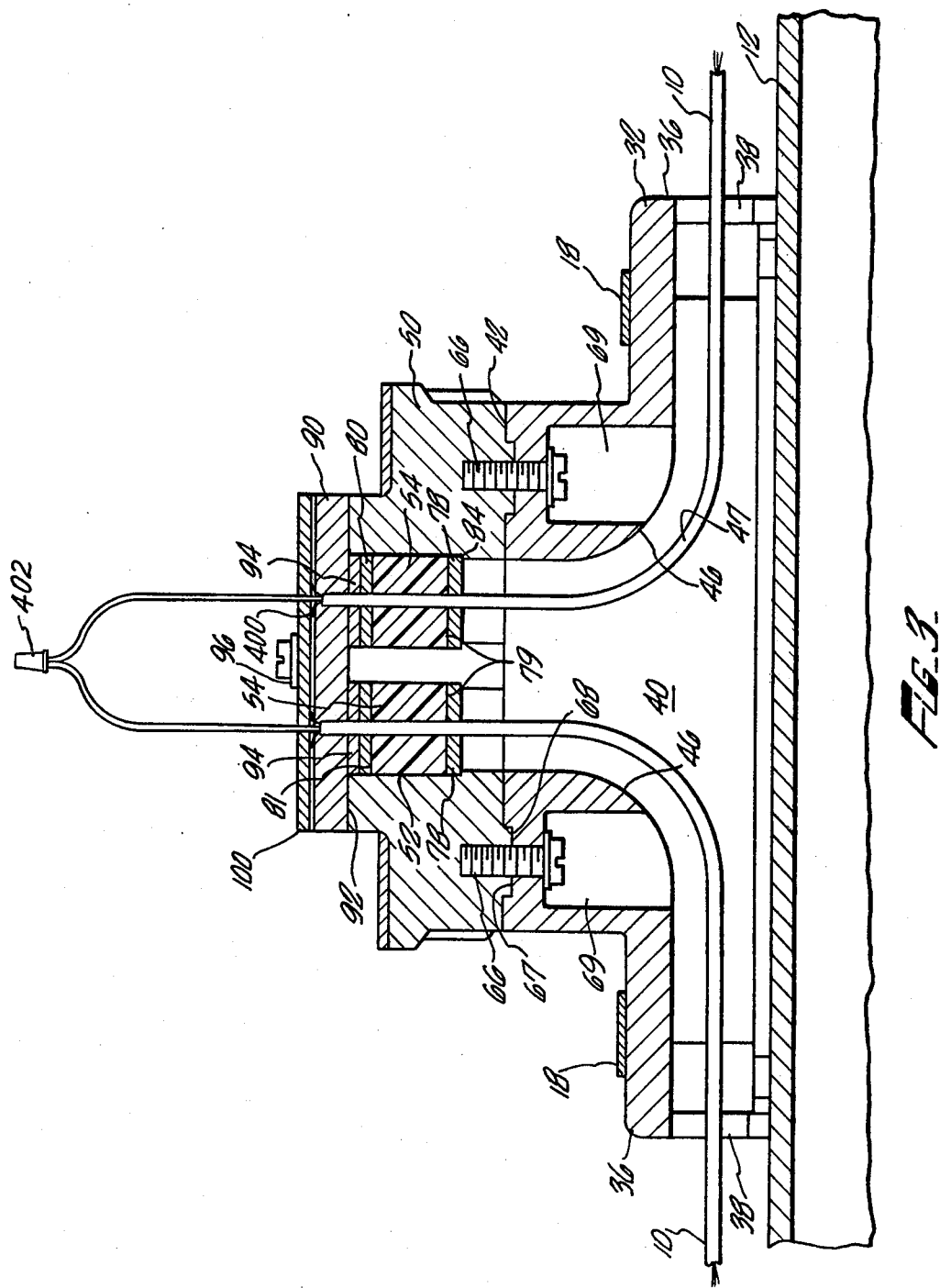
FIG. 3 is a cross-section view of the power connection assembly of FIG. 1, with the connection box and cover removed, taken along line 3—3 of FIG. 1.

With reference to FIGS. 2 and 3, the power connection assembly or housing 16 comprises a mounting bracket 32 which is adapted to sit on the surface of pipe 12. The mounting bracket has two shoulders or flanges 34, each of which projects axially along the longitudinal axis of the pipe 12. Each flange can have a hose clamp 18 wrapped over it and the pipe 10 for securing the power connection assembly 16 to the pipe 10. The use of two flanges with two hose clamps provides both a secure and removeable mounting of the power connection assembly on the pipe.

The face 36 of each flange 34 facing longitudinally has a rectangularly shaped entrance hole 38 therethrough providing access for the heater strips 10 into the interior 40 of the mounting bracket. The surface 42 of the mounting bracket 32 facing radially relative to the longitudinal axis of the pipe has an exit hole 44 therethrough through which the ends of the heater strips 10 extend and are held vertically away from the surface of the pipe. The heater strips make a 90° turn in the mounting bracket of the power box assembly between the entrance hole 38 and the exit hole 44. To facilitate this turn and avoid undue stress on the heater strips the interior surface 46 of the mounting bracket serve as an entrance ramp by being radiused to support the bent portions 47 of the heater strips 10.

The mounting bracket has a grounding lug 56 for attachment of grounding elements of the heater strips. The grounding element can be passed from the interior 40 of the power box connection assembly through an opening 58 in the wall of the mounting bracket and secured to the grounding lug 56.

Although the mounting bracked is shown in the figures as being mounted on a horizontally extending pipe, it may be mounted on any straight pipe extending in any direction. Moreover, the mounting bracket is provided with a flange 62 at the base of each exterior corner so that the mounting bracket can be mounted on any substantially flat surface.

The mounting bracket supports a base plate 50 having two cavities 52. Each heater strip extends through a cavity 52. Sealing means such as a grommet assembly 54 is contained in each cavity 52 for each heater strip. The base plate and the mounting bracket are fabricated as separate units for ease of manufacture. However, they can be formed as a single unit. The base plate and mounting bracket preferable are fabricated from diecast aluminum. One of the cavities 52 can be sealed off with a solid grommet if so desired.

The base plate 50 and mounting bracket 32 are held together with two screws 66 (FIG. 3), each of which extends through a hole in the roof 67 and an aligned hole in the floor of the base plate 50. Positive alignment of the base plate 50 and the bracket 32 is assured by a pair of bosses 68 on the base plate 50 which mate with recesses in the roof 67. Recesses 69 are provided in the mounting bracket so that the screws 66 will not contact the heater strips passing thereunder.

The cavities 52 through the base plate are oval-shaped in cross-section to conform to the shape of the exterior surface of the grommet assemblies 54 and are slightly larger than the grommet assemblies so that the grommet assemblies can easily be placed in the cavities 52. Each grommet assembly has an opening 72 through it sized to correspond with the size of the heater strip extending through the housing assembly. Different sized and shaped heater strips can be accommodated by the housing just by changing the grommet assemblies, i.e., the assembly is universal for substantially all heater strips. The only change necessary is changing the grommet assembly so that the opening 72 through the grommet assembly is properly sized. For example, flat, oval, round, square or triangular heater strips can all be accommodated merely by changing the grommet assembly. When heater strip is sold, it is sold with grommet assemblies of the requisite configuration.

The grommet assemblies 54 are supported in the cavities 52 by means of two grommet support plates, a lower plate 78 for the face 79 of the grommet assembly toward the pipe 10 and an upper plate 80 for the face 81 of the grommet assembly away from the pipe 10. The wall of each cavity 52 is provided with a shoulder 84 against which a lower grommet support 78 is seated. Thus, each grommet assembly is located in a chamber, the walls of which are provided by the grommet support plates 78 and 80 and the base plate.

The grommet assemblies are deformed so that they press against the circumferential wall of the cavity 52 and are pressed tightly and snugly against the heater strips 10. Such deformation is effected by a pressure plate 90 which has on its surface 92 facing the pipe 12 two oval-shaped flanges 94, one flange for each grommet assembly 54. Each of the flanges on the pressure plate is pressed against a mating upper grommet support plate 80 by a fastening means such as a pair of self-tapping screws 96 which are threaded into the base plate 50. This deforms the grommet assemblies so that each substantially completely fills its chamber and presses against a heater strip, thereby providing an environmental seal.

The grommet assemblies are deformable, corrosion resistant, electrically non-conductive and preferably are chemically resistant to materials commonly carried in pipelines. When the grommet assembly comprises a single grommet, preferably the material for the grommet is extrudable so that the grommets can be formed by extruding long rods having the desired configuration and then cutting the rods to provide grommets of the desired thickness.

Preferred materials for a grommet assembly comprising a single grommet are Neoprene rubber compound manufactured by Kirkhill Rubber Co. of Brea, Calif., and preferably compound No. 2550-A-370, and a rubber compound based on the combination of vinylidene fluoride and hexafluoropropylene such as a Viton rubber compound, and preferably compound No. CDX-60-173 manufactured by Kirkhill Rubber Co.

Figure 6:
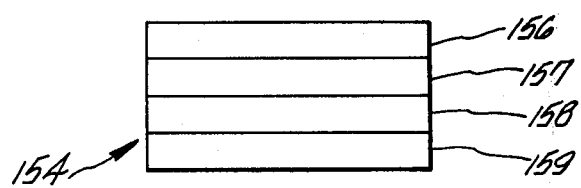
FIG. 6 is a front elevation view of a grommet assembly suitable for use with the power connection assembly of FIG. 1 and the splice connection assembly of FIG. 4, and the end seal assembly of FIG. 5.

Although the grommet assembly 54 is shown in FIGS. 2–5 as a single oval-shaped grommet, the grommet assembly can comprise two or more grommets as shown in FIG. 6. The grommet assembly 154 shown in FIG. 6 comprises four grommets 156, 157, 158, 159 stacked or layered on top of each other. The grommets can be of different thickness and/or of different materials. For example, the outer grommets 156 and 159 can be made of Viton for chemical resistance and the inner grommets 157 and 158 can be made from easily deformable, low cost Neoprene for a good seal against the heater strips. For occasions where low temperature flexibility is needed, silicone rubber can be used for the top three grommets 156, 157, and 158, with a bottom grommet 159 made of Viton for chemical resistance. Also, one or more grommets can be made from a non-flammable and/or electrically conductive material, such as Teflon or a metal to control the pressure on and configuration of the other grommets.

For some types of heater strips, it is not practical to ground the heater strip at the lug 56 of the mounting bracket. This is because in some heater constructions the grounding element is inside a protective sheath which must not be breached outside the seal area, or else chemicals or water can reach the conductors. This invention provides a novel grounding technique for such a heater strip. This technique utilizes an electrically conductive ground plate 100 held by the screws 96 against the pressure plate 90. The grounding element 400 of the heated strip is placed between the ground plate 100 and the pressure plate 90, and is held tightly in place by the pressure caused by the screws 96. It has been found that this grounding technique yields a very secure and long-lasting ground, even when subjected to severe temperature cycling. Another advantage of this technique is that the grounding element is held away from the exposed end portion 110 of the conductor wires of the heater strips, thereby facilitating their electrical connection.

As shown in FIG. 3, the heater strips extend beyond the ground plate 100, and the end portions 110 of conductor wires of the heater strip are stripped of insulation so that they can be joined to a power source. These exposed ends of the wires, the ground plate, and pressure plate are all housed within a housing or connection box 120. The connection box has a hole (not shown) in its base so that it fits over the heater strips 10, the ground plate 100, the pressure plate 90, and an upraised portion 122 of the base plate. The base 123 of the connection box 120 is mounted against a circumferential shoulder 124 of the base plate. The circumferential shoulder is around the upraised portion 122. A lower sealing gasket 126 is placed between the connection box and the circumferential shoulder 124 of the base plate. The connection box can have an opening 140 in one of its four side walls for bringing in power conduit from any direction. The opening can be oriented in any of four directions merely by repositioning the connection box. Additional holes can be added in any or all of the sidewalls to allow more than one conduit entry or the installation of indicator lights, switches and the like.

The enclosure is completed by means of a cover 142 which is secured by four fasteners such as cover screws (not shown) to the top of the connection box 140 with an upper sealing gasket 144 between the connection box and the cover. The connection box 140, the lower sealing gasket 126, and the base plate 50 are all held together by means of four screws (not shown) which are placed in holes at the corners of each of these portions of the power connection assembly. There are holes (not shown) in the bottom corners of the connection box for this purpose.

There are many advantages, in addition to those enumerated above, to the power connection assembly 16 shown in FIGS. 2 and 3. For example, the assembly is universal, in that by varying only the size of the holes through the grommet assembly, it is possible to accommodate a large variety of shapes and sizes of heater strips. Because of this, the assembly 16 can be manufactured in quantity, thereby lowering unit cost. Due to the elastic nature of the grommet assembly, several strip sizes can be accommodated by a single grommet size.

Another advantage of the power connection assembly is its performance characteristics. Because the heater strips are held up and away from the pipe, there is little danger of contamination of a heater strip when a pipe ruptures or other spill occurs. Also, heater connections are easy accessible. Just by loosening four fasteners and twisting the cover by a quarter turn it can be removed and access can be had to the heater strips for altering or repairing a connection. By loosening the four screws holding the box 120 to the base 50, the box can be totally removed if flexible conduit is used to provide power or if a conduit disconnect is provided. This allows unlimited four sided access to all connections.

Another advantage of this assembly is that the grommet assembly provides a sufficiently good environmental seal that the power connection assembly 16 achieves a NEMA-4 rating from the National Electrical Manufacturers Association. To achieve such a rating it is necessary that the power connection assembly be water-tight even under a high pressure stream of water.

Furthermore, it is possible to fill all the cavities in the assembly 16 with a foam such as a closed-cell polyurethane foam to eliminate the possibility of an internal explosion. A preferred foam for this purpose is Polycel-100 foam from Coplanar Corporation of Oakland, Calif.

Another advantage of the power connection assembly 16 is that it is easily adaptable for an "H" or "T" connection. In such a connection, two heater strips are connected to a power source in a first power connection assembly and a power conduit is run between the first connection assembly and a second power connection assembly. In the second assembly, one or two heater strips are connected to the power source, thus providing three or four heater strips connected to a power source, using only one power source and only two power connection assemblies.

The power connection assembly 16 makes it easy to connect heater strips 10 to each other (such as with a wire nut 402) and/or to power. This is most easily done by bending the ends of the heater strips so that they extend roughly 90° radially from the longitudinal axis of the pipe. Each bent strip is then placed through the base plate 50, a lower grommet support 78, a grommet assembly 54, an upper grommet support 80, and the pressure plate 90. The mounting bracket 32 is then secured to the pipe and the end of the heaters are prepared for electrical termination. If used, the optional ground plate 100 is added and the whole assembly screwed together, completing the ground path and pressing the pressure plate onto the upper grommet support 80, deforming each grommet assembly so that it substantially fills its chamber and seals tightly against the strip.

All of this preparation has been greatly facilitated by the absence of the power box 120. The power box 120 is now put in place and fastened with four screws, the conduit opening 140 being oriented in any of four directions for convenient access to power. The power connection is completed by splicing the power leads followed by installation of the cover gasket 144, cover 142 and the four cover screws (not shown).

SPLICE CONNECTION ASSEMBLY

Figure 4:
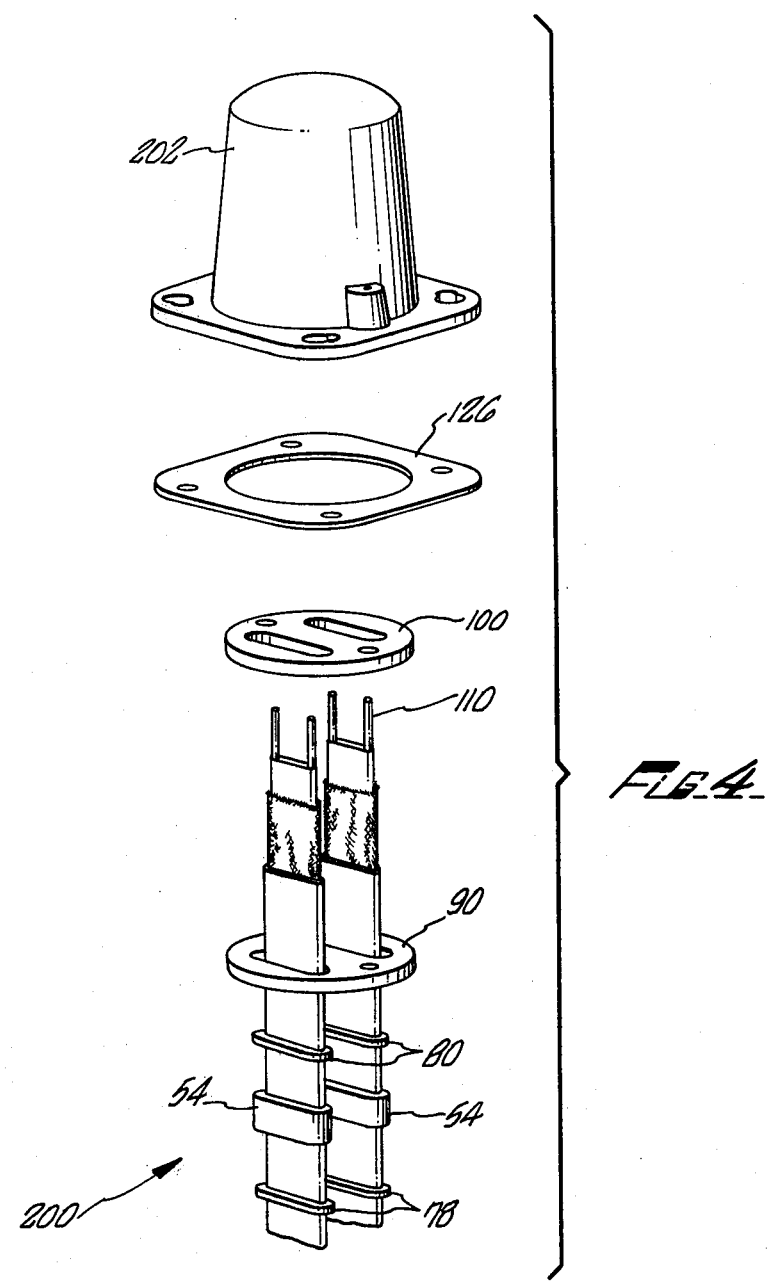
FIG. 4 is an exploded view of a portion of a splice connection assembly of the present invention.

FIG. 4 shows a splice connection assembly of the present invention. Portions of the splice connection assembly shown in FIG. 4 and portions of the power connection assembly shown in FIGS. 2 and 3 that have the same reference numerals are identical.

As evident from FIG. 4, the splice connection assembly is essentially identical to the power connection assembly 16. The only difference between the power connection assembly and the splice connection assembly is that the connection box 140 and its cover 142 are replaced by a unitary splice cover 202. The splice cover is preferably dome-shaped so that spilled chemicals and other contaminants cannot collect on the cover and so that falling objects are deflected away instead of making solid impact.

END SEAL ASSEMBLY

Th end seal assembly 14 is shown in FIG. 5. This assembly has the same grommet assembly 54 and grommet supports 78 and 80 used for the power connection assembly. The end seal assembly 14 comprises an oval-shaped cap 302 and a housing 304 oval-shaped in cross-section. The housing 304 has a closed-end 310, an open-end 312, and a passage 313 from the open end to the closed end. When the end seal assembly is assembled together, a grommet support 78 and the grommet asembly 54 are located in the passage. The grommet support 78 sits against a shoulder within the passage 313. Because of the shoulder, the cavity is larger in cross-section at the open end 312 than it is at the closed end 310 of the housing. A second grommet support 80 is placed over the grommet assembly 54 and the cap 302 is placed over the second grommet support 80. As shown in FIG. 5, the housing is sufficiently large that a circuit element such as a sensing element 316 can be on the heater strip and accomodated within the closed end 310.

The cap 302 has a flange (not shown) on the surface facing the housing for pressing against the grommet support 80 much like the flange 94 of the pressure plate 90 presses against the grommet support 80. Both the cap 302 and housing 304 have a pair of ears 340, 342 respectively, with each ear having a screw hole 344 therethrough which are aligned when the housing and cap are assembled. The cap 302 and housing 304 preferably are formed of a corrosion resistant, solvent resistant, electrically non-conductive, and mechanically strong material. The preferred material is a polyphenylene sulfide molding material such as Ryton R-4, manufactured by Phillips Petroleum.

The end seal assembly is used by inserting a heater strip 10 with the conducting and ground wires exposed into the housing through aligned oval-shaped holes through the end cap 302, the two grommet supports 78 and 80 and the grommet assembly 54. Deformation of the grommet assembly 54 is effected by inserting screws 346 through the holes 344 and tightening the screws. This causes the end cap 302 to press against the grommet support 80 which deforms the grommet asembly 54, the grommet assembly thereby pressing snugly and tightly against the heater strip 10.

From the foregoing description, it is evident that the sealing assembly and the grommet assembly described herein have many uses. They are useful for different types of connections with heater strips, namely power connections, splice connections and end terminations. The sealing assembly is simple, comprising only a grommet assembly, two support plates for the grommet assembly, a chamber which includes support means for one of the grommet support plates, and means for compressing the grommet assembly. The sealing assembly is easily adapted for sealing heater strips of various configurations and dimensions.

Although the present invention has been described in a considerable detail with reference to certain preferred versions thereof, other versions are possible. For example, although the invention has been described in considerable detail with regard to connecting heater strips, this invention is also useful for electrically connecting conductors other than conductors of heater strips. Therefore, the scope of the appended claims should not necessarily be limited to the preferred versions described herein.

What is claimed is:

1. An apparatus for electrically terminating at least two heater strips located on a support surface comprising:
  (a) a deformable, electrically non-conductive grommet assembly for each heater strip, each grommet assembly being sized to fit circumferentially around one of the heater strips, each grommet assembly being oriented so as to hold an end of a heater strip away from the support surface;
  (b) chambers in a side by side relationship, one chamber for each grommet assembly, each chamber supporting and substantially completely surrounding a grommet assembly; and
  (c) means for deforming the grommet assemblies so each grommet assembly substantially completely fills its corresponding chamber and tightly seals against its corresponding heater strip.

2. The apparatus of claim 1 including means for limiting the amount each grommet assembly presses against its corresponding heater strip.

3. An apparatus for electrically terminating at least two heater strips located on a support surface comprising:
  (a) a deformable, electrically non-conductive grommet assembly for each heater strip, each grommet assembly being sized to fit circumferentially around one of the heater strips, each grommet assembly being oriented so as to hold an end of a heater strip away from the support surface;

(b) chambers in a side-by-side relationship, one chamber for each grommet assembly, each chamber supporting and substantially completely surrounding a grommet assembly; and (c) a single pressure plate for deforming the grommet assemblies so each grommet assembly substantially completely fills its corresponding chamber and tightly seals against its corresponding heater strip.

4. The apparatus of claim 1 in which each grommet assembly is oval-shaped and at least one such grommet assembly is removably supported in its chamber so that different grommets assemblies having the same exterior dimensions but sized to fit heater strips of different exterior dimensions can be placed in the chamber for such removable grommet assembly.

5. The apparatus of claim 1 in which each grommet assembly is oval-shaped.

6. The apparatus of claim 1 in which at least one grommet assembly comprises a single grommet.

7. The apparatus of claim 1 in which at least one grommet assembly comprises at least two grommets, the grommets be vertically stacked, at least one of the grommets being formed of a material different from the material from which another grommet is formed.

8. The apparatus of claim 1 in which the support surface is a pipe.

9. A housing for electrically connecting first and second heater strips on a pipe comprising:

(a) a mounting bracket adapted to sit on the exterior surface of the pipe, the mounting bracket having at least two flanges extending axially along the exterior surface of the pipe for placement of clamping means on each flange and around the pipe for maintaining the mounting bracket in a selected position on the pipe, the mounting bracket having exit means for the heater strips, the exit means being oriented for maintaining the ends of the heater strips away from the surface of the pipe, the mounting bracket also having an entrance hole for each heater strip so that the heater strips can be inserted into the housing;

(b) a first deformable, electrically non-conductive sealing means for placement around the first heater strip and a second deformable, electrically non-conductive sealing means for placement around the second heater strip, each sealing means having a hole therethrough aligned with the exit means through the mounting bracket, each hole through a sealing means corresponding to the size and shape of a heater strip;

(c) elements defining a chamber for holding each of the sealing means in side-by-side relationship, the elements being supported by the mounting bracket; and (d) means for deforming each of the sealing means so that each sealing means substantially completely fills its chamber and tightly seals against its corresponding heater strip.

10. The housing of claim 9 including means limiting the amount that each sealing means presses against its corresponding heater strip.

11. The housing of claim 9 in which the sealing means is a grommet assembly having opposing flat faces oriented substantially parallel to the pipe.

12. The housing of claim 11 in which the elements defining the chambers comprise a base plate having holes therethrough, each hole through a base plate being aligned with the exit means through the mounting bracket, the base plate being at least as thick as the grommet assemblies and supported by the mounting bracket, and a grommet support for each flat face of each grommet assembly.

13. The housing of claim 11 in which each grommet assembly is oval-shaped.

14. The housing of claim 11 in which at least one grommet assembly comprises a single grommet.

15. The housing of claim 11 in which at least one grommet assembly comprises at least two grommets, the grommets being vertically stacked, at least one of the grommets being formed of a material different from the material from which another grommet is formed.

16. The housing of claim 9 wherein at least one heater strip comprises a grounding element, the housing including means for grounding the grounding element of a heater strip.

17. The housing of claim 16 in which the means for grounding comprises a grounding terminal on the mounting bracket.

18. The housing of claim 16 in which the means for grounding comprises a grounding plate for compressing a grounding element against the deforming means, both the grounding plate and the deforming means being formed of electrically conductive material.

19. The housing of claim 9 in which the entrance holes of the mounting brackets are oriented so that each heater strip can be brought into the housing in a direction generally parallel to the pipe.

20. The housing of claim 19 in which the mounting bracket has an inner surface which is radiused so that each heater strip can be gently bent so that its end extends generally perpendicular to the pipe.

21. A method for electrically connecting first and second substantially flat heater strips mounted on a support surface, each heater strip having at least one conductor, the method comprising the steps of:

(a) selecting a housing comprising:

(i) a mounting bracket adapted to sit on the exterior surface of the support surface, the mounting bracket having exit means for the heater strips, the exit means being oriented for maintaining the ends of the heater strips away from the support surface, the mounting bracket also having an entrance hole for each heater strip so that the heater strips can be inserted into the housing;

(ii) a first deformable, electrically non-conductive sealing means for placement around the first heater strip and a second deformable, electrically non-conductive sealing means for placement around the second heater strip, each sealing means having a hole therethrough aligned with the exit means through the mounting bracket, each hole through a sealing means corresponding to the size and shape of a heater strip;

(iii) elements defining a chamber for holding each of the sealing means in side-by-side relationship, the elements being supported by the mounting bracket; and (iv) means for deforming each of the sealing means so that each sealing means substantially completely fills its chamber and tightly seals against its corresponding heater strip;

(b) bending each heater strip so that each extends substantially perpendicular to the support surface;

(c) passing the bent heater strips through the exit means of the mounting bracket, through the chamber and through the sealing means of the housing;

(d) placing the mounting bracket with the heater strips extending therethrough on the support surface;

(e) deforming each sealing means so that each sealing means completely fills its chamber and seals tightly against the heater strip; and (f) electrically connecting each conductor of each heater strip.

22. The method of claim 21 in which the step of electrically connecting comprises connecting conductors of each power strip to a heater source.

23. The method of claim 21 in which the step of electrically connecting comprises connecting conductors of one heater strip to conductors of another heater strip.

24. The method of claim 21 in which each heater strip comprises a grounding element and including the step of grounding the grounding element of each heater strip between an electrically conductive grounding plate and the means used for deforming each sealing means, the deforming means also being electrically conductive.

* * * * *